United States Patent
Miers et al.

(10) Patent No.: US 11,496,192 B1
(45) Date of Patent: Nov. 8, 2022

(54) SYSTEMS AND METHODS FOR PHASE BASED APERTURE SPLITTING AND NULLING OF PHASED ARRAY ANTENNA SYSTEMS

(71) Applicant: Ball Aerospace & Technologies Corp., Boulder, CO (US)

(72) Inventors: Zachary T. Miers, Broomfield, CO (US); Ryan Jennings, Broomfield, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 17/211,021

(22) Filed: Mar. 24, 2021

Related U.S. Application Data

(60) Provisional application No. 62/994,094, filed on Mar. 24, 2020.

(51) Int. Cl.
*H04B 7/06* (2006.01)
*H04W 16/28* (2009.01)

(52) U.S. Cl.
CPC .......... *H04B 7/0617* (2013.01); *H04W 16/28* (2013.01)

(58) Field of Classification Search
CPC ............................ H04B 7/0617; H04B 7/0408
USPC ........................................................ 375/267
See application file for complete search history.

(56) References Cited

U.S. PATENT DOCUMENTS

| | | | |
|---|---|---|---|
| 4,588,994 A | 5/1986 | Tang et al. | |
| 4,983,977 A | 1/1991 | Hrycak | |
| 5,079,557 A | 1/1992 | Hopood et al. | |
| 6,741,208 B1 | 5/2004 | West et al. | |
| 6,771,218 B1 * | 8/2004 | Lalezari | H01Q 1/28 342/373 |
| 10,468,781 B1 * | 11/2019 | Paulsen | H01Q 3/26 |

\* cited by examiner

*Primary Examiner* — Sam K Ahn
*Assistant Examiner* — Gina M McKie
(74) *Attorney, Agent, or Firm* — Sheridan Ross P.C.

(57) ABSTRACT

Phased array antenna systems and methods for operating phased array antenna systems to efficiently generate multiple beams from a single phased array aperture are disclosed. Elements included in a phased array antenna are randomly assigned to generate one of first or second beams. A phase index for the first set of elements is iterated n times, and a total difference in phase amounts for neighboring elements belonging to different ones of the first and second sets is calculated for each of the n iterations. The phase index resulting in the smallest calculated difference is applied to generate the first beam. The first and second beams are generated from the single phased array aperture simultaneously.

19 Claims, 10 Drawing Sheets

| 80 | 90 | 100 | 110 | 120 | 130 | 140 | 150 |
|----|----|-----|-----|-----|-----|-----|-----|
| 80 | 90 | 100 | 110 | 120 | 130 | 140 | 150 |
| 80 | 90 | 100 | 110 | 120 | 130 | 140 | 150 |
| 80 | 90 | 100 | 110 | 120 | 130 | 140 | 150 |
| 80 | 90 | 100 | 110 | 120 | 130 | 140 | 150 |
| 80 | 90 | 100 | 110 | 120 | 130 | 140 | 150 |
| 80 | 90 | 100 | 110 | 120 | 130 | 140 | 150 |
| 80 | 90 | 100 | 110 | 120 | 130 | 140 | 150 |

FIG. 4

SYSTEMS AND METHODS FOR PHASE BASED APERTURE SPLITTING AND NULLING OF PHASED ARRAY ANTENNA SYSTEMS

CROSS-REFERENCE TO RELATED APPLICATIONS

This application claims the benefit of U.S. Provisional Patent Application Ser. No. 62/994,094, filed Mar. 24, 2020, the entire disclosure of which is hereby incorporated herein by reference.

FIELD

The present disclosure is directed to systems and methods for pseudo-random phase based aperture splitting and nulling for single aperture phased array antenna systems.

BACKGROUND

Radio frequency (RF) communication links are commonly used to transfer information and to control devices. RF signals are also used by radar devices for remote sensing operations. In order to send and receive RF signals, various antenna types, including phased array antennas, have been developed. In a typical phased array antenna, a plurality of radiating elements is arranged in a two-dimensional array. Phased array antenna systems have a variety of applications in present day communications and surveillance systems. For example, phased array antenna systems can be used in high performance wireless communications networks, such as Multi Input Multi Output (MIMO) antenna arrays associated with fifth generation 5G cellular communications systems. As another example, phased array antenna systems can be used in satellite communication systems. In such applications, the beam pattern produced by the antenna is often dynamically steered and/or modulated by selectively controlling the phase and/or amplitude of signals associated with different antenna elements. By controlling the phase of the signal at selected elements in the array, the resulting beam can be pointed or steered. This in turn can facilitate the gain realized by the antenna relative to a far field transceiver, endpoint, or target.

In addition to controlling individual elements or groups of elements in a phased array for purposes of electronically pointing a beam, different elements of a phased array antenna can be controlled to support different beams. The creation of multiple beams can facilitate using a single phased array antenna to communicate with or track multiple endpoints or objects simultaneously. However, previous techniques for forming multiple beams from a single phased array aperture have resulted in systems having severely degraded performance characteristics.

SUMMARY

Embodiments of the present disclosure are directed to systems and methods for creating a dual (or multiple) beam phased array through the use of a single beam aperture. More particularly, two or more beams can be formed in different spatial orientations at independent frequencies from a single beam aperture, with reduced impacts on antenna performance as compared to prior techniques. Generation of the beams includes randomly or pseudo-randomly selecting a first set of elements for operation in connection with a first one of the beams and assigning remaining elements to a second one of the beams. An index location of phase amounts assigned to antenna elements for generating the first beam is then varied, while the index location of phase amounts assigned to antenna elements for generating the second beam are held constant. The index location of phase amounts assigned to antenna elements for generating the first beam that results in the smallest phase difference between neighboring elements within the first and second sets of elements is then applied.

Methods in accordance with embodiments of the present disclosure assign elements within the phased array to the different beams randomly or pseudo-randomly, to randomize beam tapering. A first phase index amount, or starting phase value, is selected, and phase amounts for generating a first beam are assigned to elements in a first set of the elements, which are assigned to generate the first beam. A phase index amount is also selected, and phase amounts for generating the second beam are assigned to elements in a second set of the elements. Next, a total phase difference between neighboring elements assigned to the different beams is calculated. The phase index of one of the sets of elements for one of the beams is then iterated while the phase index for the other of the sets of elements is held constant, and the total phase difference between neighboring elements assigned to the different beams is again calculated. This process can be continued through a number of iterations. The phase index resulting in the smallest total difference is then selected and utilized to generate a beam.

Additional features and advantages of embodiments of the disclosed systems and methods will become more readily apparent from the following description, particularly when taken together with the accompanying drawings.

BRIEF DESCRIPTION OF THE DRAWINGS

FIG. 4 is top plan view of a phased array antenna, and depicts a phase shift of each antenna element to create a single beam steered toward the right of the figure;

DETAILED DESCRIPTION

Figure 1:
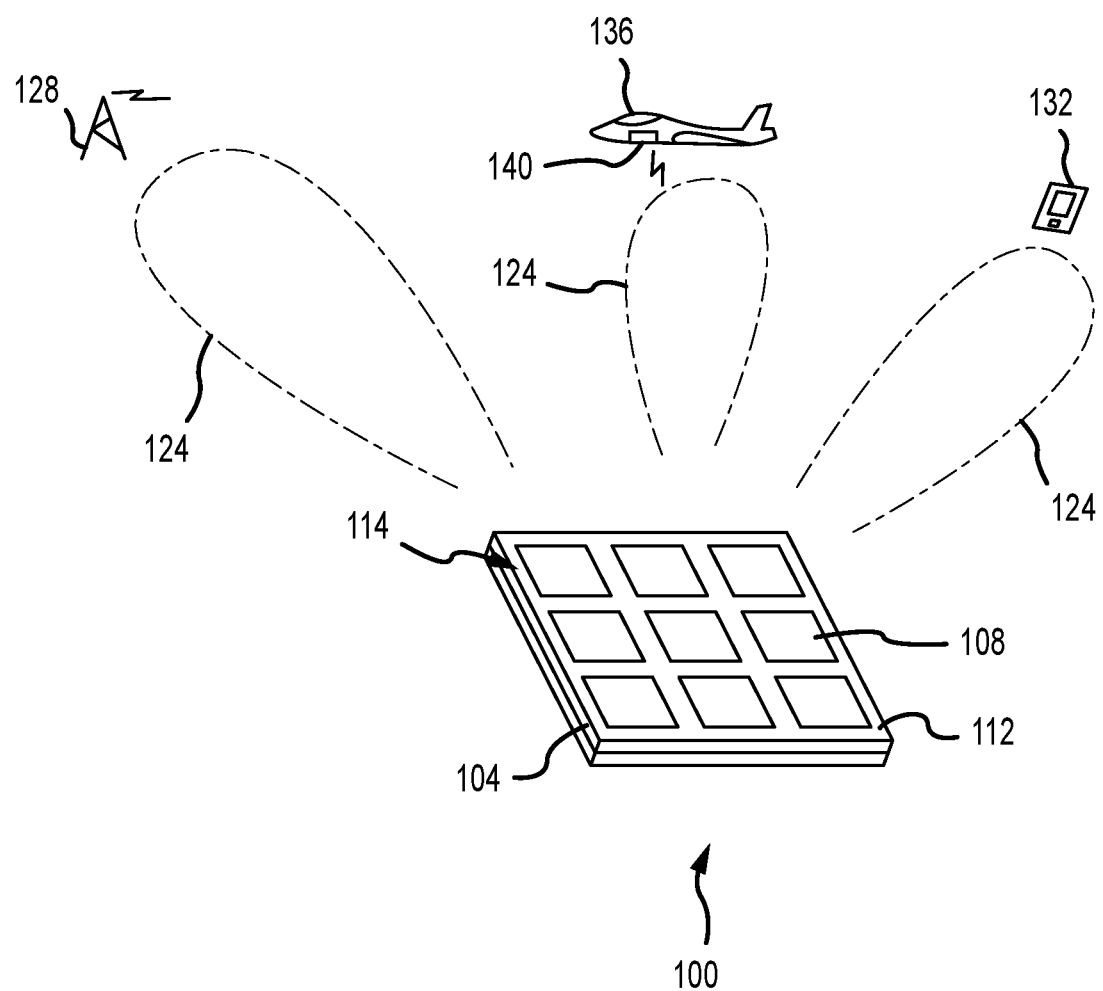
FIG. 1 depicts a phased array antenna forming multiple beams in accordance with embodiments of the present disclosure.

As depicted in FIG. 1, a communication or sensor system 100 incorporating a typical electronically steerable array antenna 104, also referred to herein as a phased array antenna, consists of multiple individual radiating elements or antenna elements 108, disposed on a planar antenna substrate 112 having one or more layers to form an array or matrix 114. In this example, the array 114 is a two-dimensional array having 9 elements 108 in a 3×3 matrix; however, other arrangements, such as but not limited to linear arrays, rectangular arrays, and arrays having a large number (e.g., 16 or greater) of elements 108, are possible. As can be appreciated by one of skill in the art, the number, size and spacing of the elements 108 can be selected based on various anticipated or desired operating characteristics of the antenna 104, including but not limited to operating frequencies, desired gain, and steering angles.

The elements 108 in a phased array antenna 104 in accordance with embodiments of the present disclosure can be operated to receive, transmit, or transmit and receive electromagnetic signals or beams 124. Moreover, the different elements 108 can be selectively operated at different gain and/or phase amounts relative to one another. The electromagnetic signals 124 can include communication signals sent between the phased array antenna 104 and communication system base stations 128, mobile devices 132, such as mobile telephones or other communication devices, signals sent as part of satellite communication systems, radar systems to determine the presence and location of distant objects 136, signals received from other transmission sources 140 that the antenna is operational to detect as part of a signal or threat warning system, or any other purpose. Embodiments of the present disclosure enable a system 100 having a phased array antenna 108 with individually controllable elements 108 to support multiple independent beams 124 with a reduced impact on beam 124 performance characteristics as compared to previous techniques.

Figure 2:
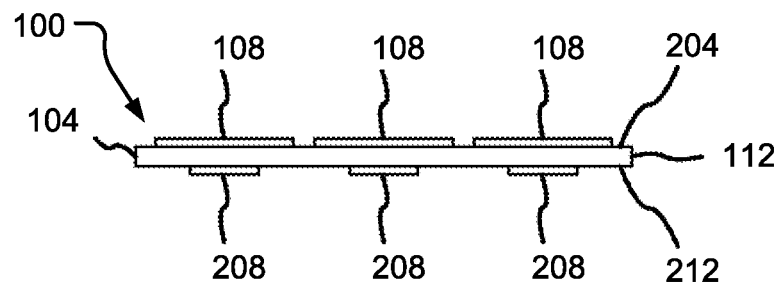
FIG. 2 is a side elevation view of an example phased array antenna.

With reference now to FIG. 2, portions of an example communication or sensor system 100 incorporating a phased array antenna 104 in accordance with embodiments of the present disclosure, are depicted in a side elevation view. As shown, the antenna elements 108 are disposed on a first side or surface 204 of an antenna substrate 112, and various circuit or feed network components 208 are disposed on a second side 212 of the antenna substrate 112. As can be appreciated by one of skill in the art after consideration of the present disclosure, the elements 108 can be formed from electrically conductive patches, and the antenna substrate 112 can be formed from a dielectric material.

Figure 3:
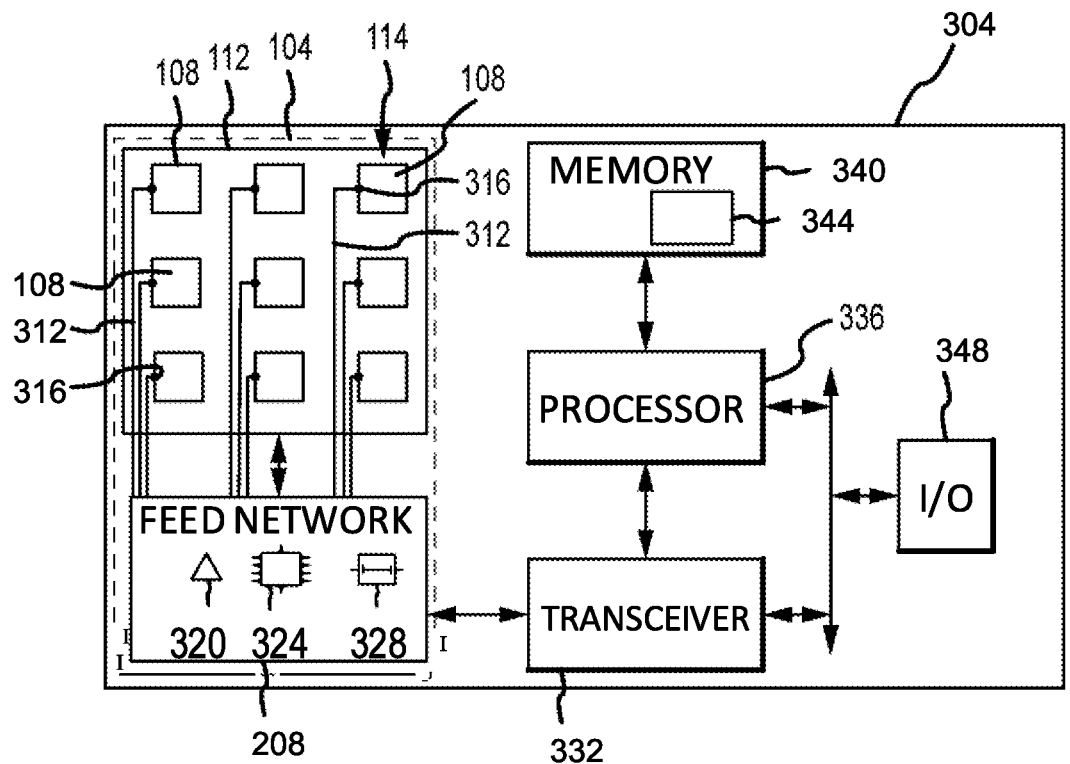
FIG. 3 depicts components of an example phased array antenna.

FIG. 3 is a block diagram depicting various components that can be included in a communication or sensor system 100 incorporating a phased array antenna 104 in accordance with embodiments of the present disclosure. In general, feed lines 312 connect components of the feed network 208 to individual antenna elements 108 at feed points 316 on or associated with each antenna element 108. As can be appreciated by one of skill in the art after consideration of the present disclosure, multiple feed points 316 and associated feed lines 312 can be provided for each element 108, for example to support or facilitate the receipt and/or transmission of multiple signals, including but not limited to signals at different polarizations, simultaneously.

The feed network 208 can include various components, such as, but not limited to, amplifiers 320, integrated circuits 324, delay circuits 328, switches, delay lines, phase shifters, attenuators, and the like. Various components of the feed network 208 can be provided for individual antenna elements. In addition, various components of the feed network 208 can be shared by multiple antenna elements 108. As can be appreciated by one of skill in the art after consideration of the present disclosure, by controlling a phase delay, amplitude, or other parameter or parameters of individual antenna elements 108, the direction of the beam 124 produced by the array 114 of antenna elements 108 can be controlled in elevation and azimuth.

Signals are passed between the feed network 208 and a transceiver 332. As used herein, a transceiver 332 can signify a receiver, a transmitter, or a combined receiver and transmitter. Depending on the end use of the antenna 104, the transceiver 332 can operate to, for example, modulate and demodulate communication signals, or send and receive radar signals. The transceiver 332 can be controlled by or operate in connection with a processor 336. The processor 336 can include a general purpose programmable processor, field programmable gate array (FPGA), controller, or other device or devices alone or in various combinations. The processor 336 can operate in connection with a memory 340. The memory 340 can include volatile and nonvolatile data storage, for example RAM, SDRAM, solid-state memory, or the like. In addition, the memory 340 can store application programming 344 that can be executed by the processor 336 in connection with the operation of the antenna system 304. The antenna system 304 can additionally include an input/output interface or facility 348. The input/output interface 348 and provide an operational connection between the antenna system 304 and other, remote or local, control systems, output devices, and the like. The various components of the antenna system 304 can be connected to one another through dedicated signal lines, and/or shared communication buses.

FIG. 4 is top plan view of a phased array antenna 104 of a system in accordance with embodiments of the present disclosure and depicts a configuration in which a phase shift 404 of each antenna element 108 is controlled to create a single beam 124 steered toward the right of the figure. In this and other example embodiments discussed herein, the antenna 104 has 64 elements 108. However, a phased array antenna 104 with any number of elements 108 can be used, although performance is generally optimized for antennas having less than 1024 elements. As can be appreciated by one of skill in the art, the phase shift 404 for each element 108 is shown in units of degrees. In this example, the aperture or array 114 utilizes 100% of the elements 108, and the phase shift 404 of groups of elements 108, here columns of elements 108, is controlled so that the phase shift gradually increases from left to right, resulting in a configuration that directs the energy, represented by the resulting beam 124, to one side (to the right in this example).

Figure 5:
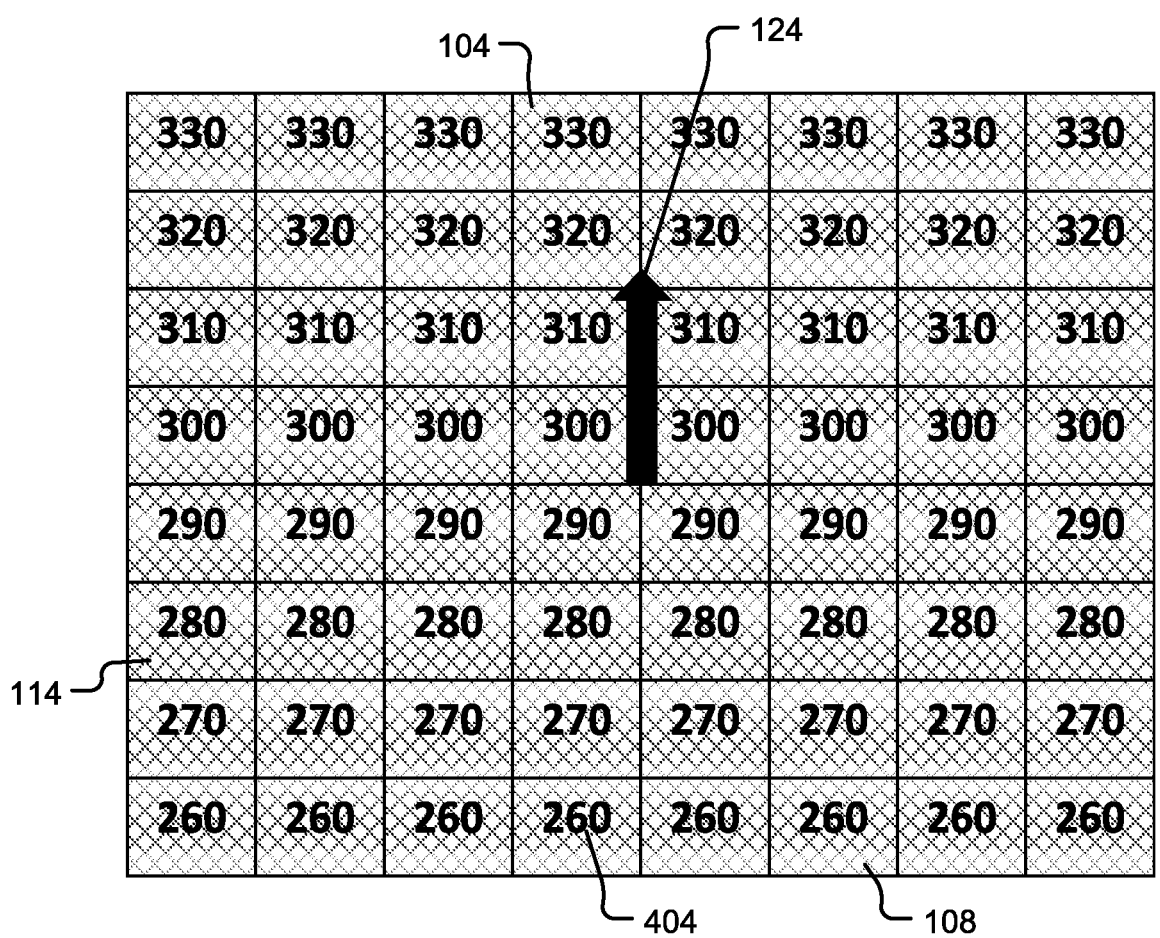
FIG. 5 is top plan view of a phased array antenna, and depicts a phase shift of each antenna element to create a single beam steered toward the top of the figure.

FIG. 5 shows the same phased array antenna 104 aperture 114 as in FIG. 4, but with the beam 124 steered off of boresight to a new location, also utilizing 100% of the elements 108 included in the aperture 114. More particularly, in this example the phase shift 404 for groups of elements 108, here rows of elements 108, is controlled so that the phase shift gradually increases from bottom to top, resulting in a configuration that directs the beam 124 toward the top of the figure.

Figure 6:
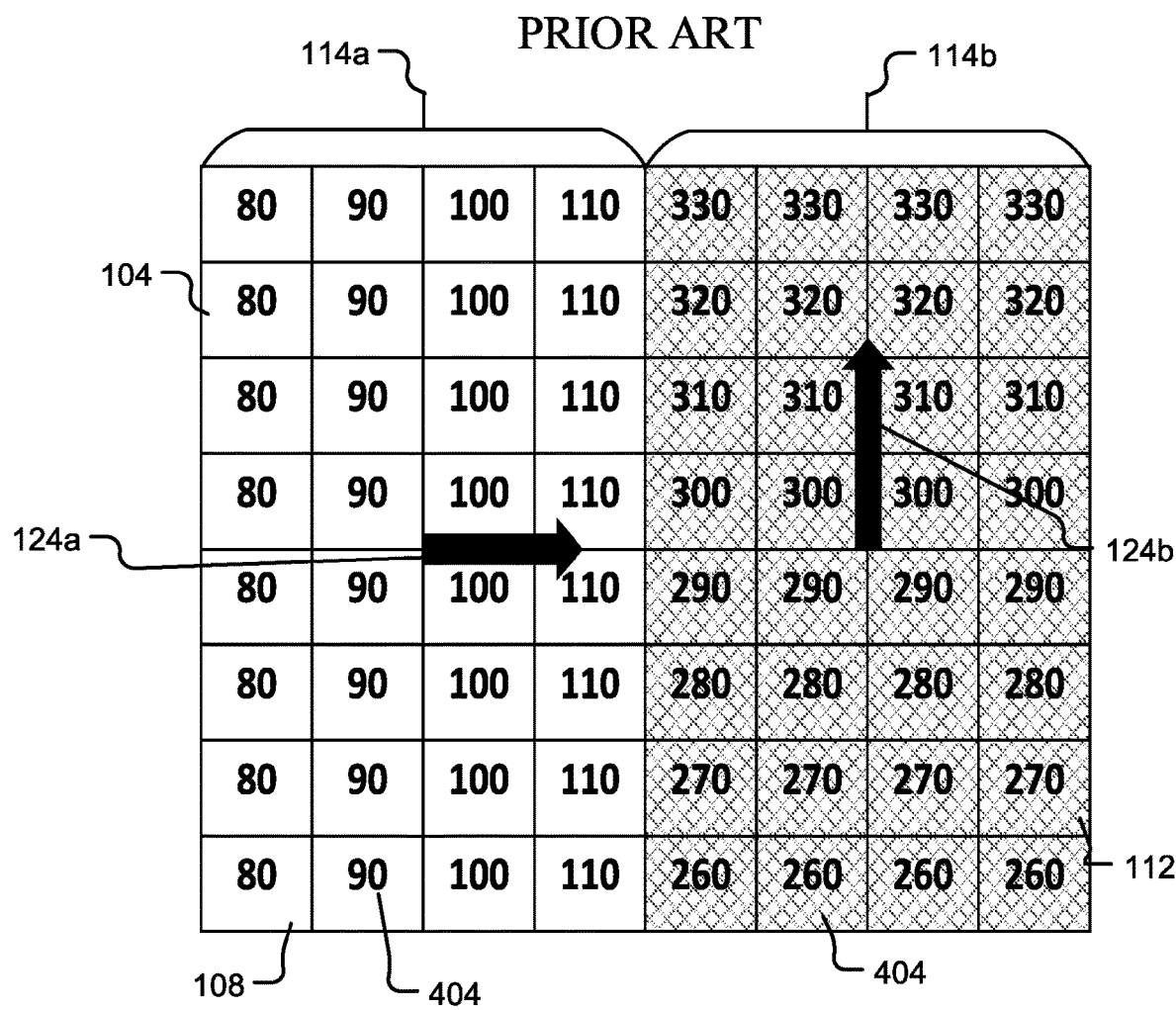
FIG. 6 is top plan view of a phased array antenna operated in accordance with the prior art, and depicts a phase shift of each antenna element to create a first beam steered toward the right of the figure and a second beam steered toward the top of the figure.

According to configurations that are exemplary of the prior art, to generate two beams 124 simultaneously using a single phased array antenna 104 aperture 114, the elements 108 of the aperture are divided or physically split into two separate apertures 114a and 114b, as shown in FIG. 6. Thus divided, the elements 108 on a first side of the phased array antenna 104 are operated as the first aperture 114a to produce and steer a first beam 124a, while the elements 108 on a second side of the phased array antenna 104 are operated as the second aperture 114b to produce and steer a second beam 124b. In the illustrated example, the first aperture 114a is being operated to steer the first beam 124a to the right in the figure, while the second aperture 114b is being operated to steer the second beam 124b to the top of the figure. By thus dividing the array in half, the aperture area is reduced by half, reducing the overall achievable gain of the antenna 104. In addition, the beamwidth of the beams 124a and 124b is greater than if they were each formed using the entire array, potentially causing regulatory compliance problems in the case of a transmit beam or interference issues in the case of a receive beam.

Figure 7:
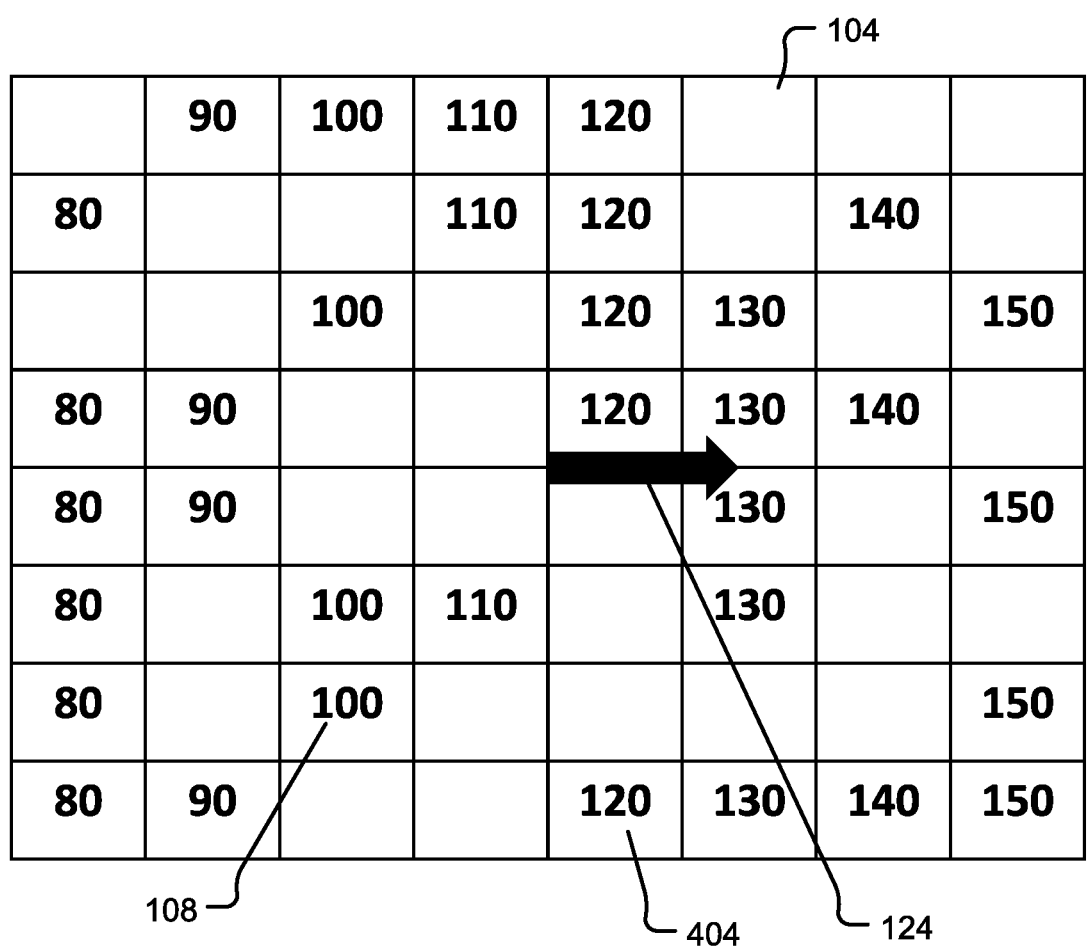
FIG. 7 is top plan view of a phased array antenna, and depicts a phase shift of each antenna element in a set of randomly selected elements to create a single beam steered toward the right of the figure.

FIG. 7 is top plan view of a phased array antenna 104 and depicts a phase shift 404 of each operational antenna element 112 in a set of randomly selected elements 108 within an array 114 to create a single beam 124 steered toward the right of the figure. In this example, the elements 112 with a phase 404 shown in the element 108 area are operational, while the elements without an associated phase 404 are off. In this configuration, the beamwidth of the beam 124 will remain the same or essentially the same as if all of the elements 108 in the array 114 were operational. In addition, although the side lobes of the resulting beam 124 will be affected, the characteristics of the main beam will not be significantly impacted as compared to a case where all of the elements 108 within the array 104 are operated to produce the beam 124.

Figure 8:
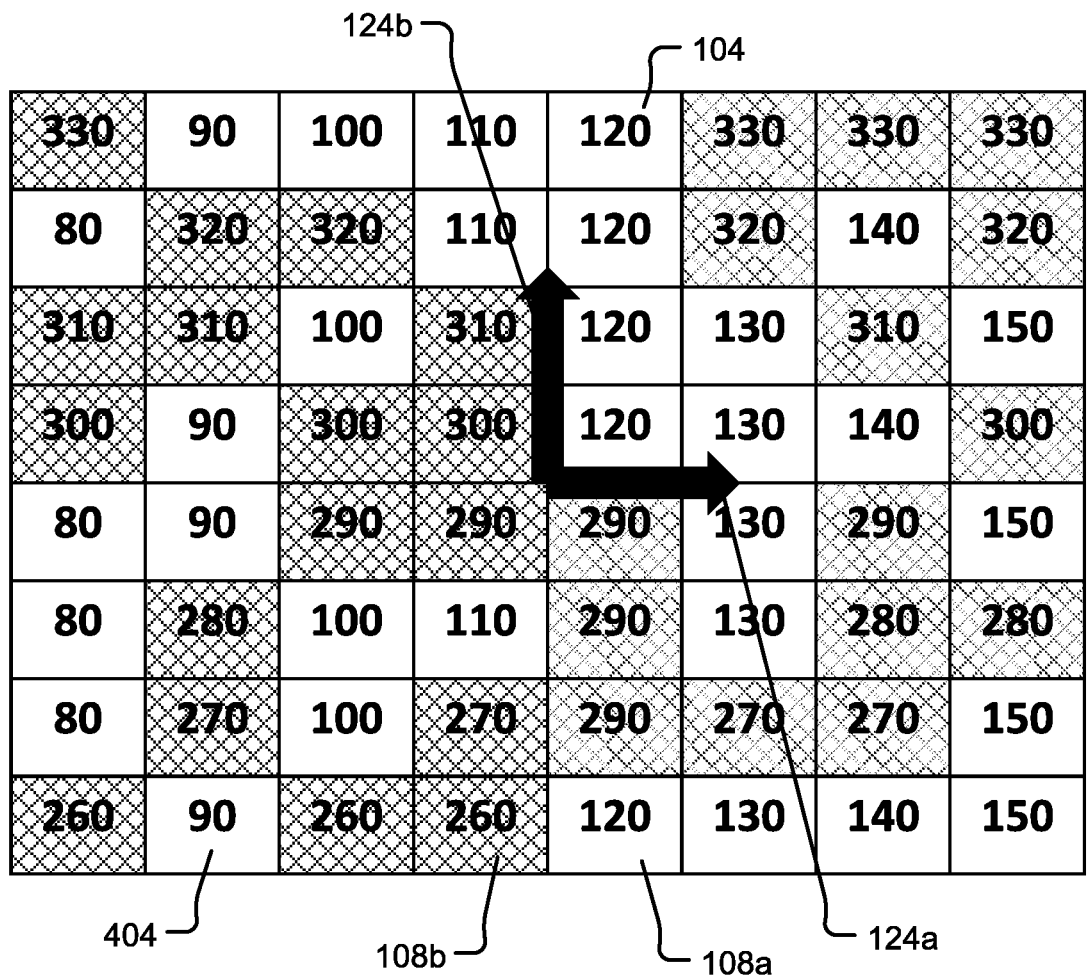
FIG. 8 is top plan view of a phased array antenna, and depicts a phase shift of each antenna element in first and second sets of randomly selected elements to create a first beam steered toward the right of the figure and a second beam steered toward the top of the figure.

FIG. 8 is top plan view of a phased array antenna 104 operated in accordance with embodiments of the present disclosure and depicts a phase shift 404 of each antenna element in first and second sets of randomly selected elements 108. In this example, the phase 404 of the first set of elements 108a, represented by unshaded element areas, is selectively controlled to create a first beam 124a that is steered toward the right of the figure. The phase 404 of the second set of elements 108b, represented by shaded element areas, is selectively controlled to create a second beam 124b steered toward the top of the figure. Thus configured, the phased array antenna 104 generates multiple, independently steerable beams 124, and the resulting beams 124 benefit from the maintenance of desired main beam characteristics enabled by the utilization of elements 108 dispersed randomly or pseudo-randomly across the available area of the antenna 104. However, with the relative phases 404 of the different sets 108a and 108b of elements controlled as shown in this example, the power of the main beams is reduced and the power to the sidelobes is increased. This is because elements along the diagonal of elements extending from the bottom left corner to the top right corner of the array move power from the intended directions into the sidelobes, thus reducing power in each of the main beams. In particular, several of the elements 108 forming the first beam 124a have a 180 degree phase reversal from the phase of the elements 108 forming the second beam 124b. Accordingly, in this example each beam will lose an additional 0.59 dB, i.e., beam power=−3 dB-0.59 dB.

Figure 9:
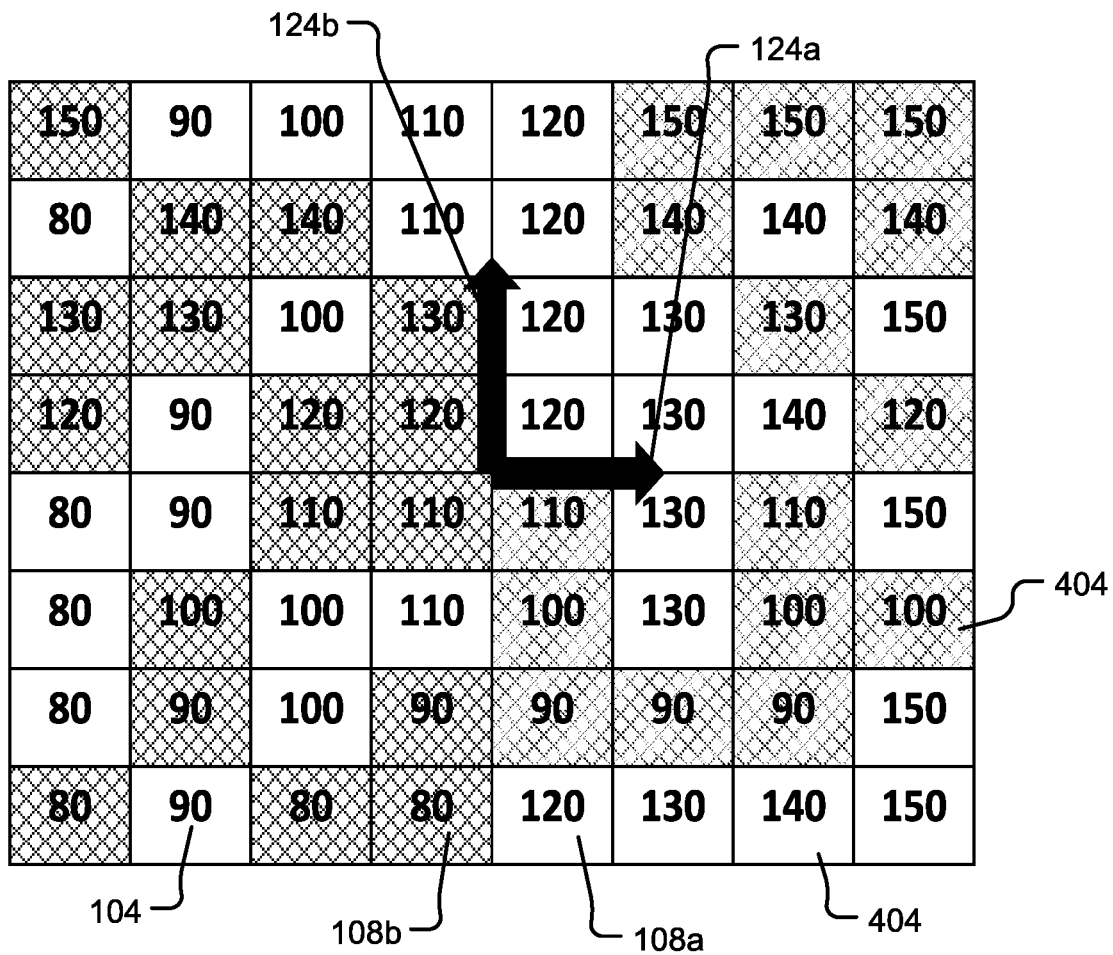
FIG. 9 is top plan view of a phased array antenna, and depicts a phase shift of each antenna element in first and second sets of randomly selected elements to create a first beam steered toward the right of the figure and a second beam steered toward the top of the figure, as in FIG. 8, but with a revised phase index location for one of the beams.

In order to avoid this reduction in realized beam 124 power, embodiments of the present disclosure provide for the informed selection of the relative phase index locations of the beams 124 generated by randomly or pseudo-randomly selected elements 108. In particular, the index location of the phase 404 amounts applied to the elements 108 associated with at least one of the beams 124 is selected so that the difference in phases 404 of neighboring elements 108 is minimized. An assignment of phases 404 in accordance with embodiments of the present disclosure such that the difference in phase between neighboring elements 108 assigned to different beams 124a and 124b is reduced as compared to the assignment of phases 404 of FIG. 8, with the beams steered in the same directions and using the same frequencies as in FIG. 8, is shown in FIG. 9. In particular, the index location of the phases 404 applied to generate the second beam 124b has been revised. With this selection of phase 404 assignments, the overall aperture efficiency is increased from −3 dB to −2.49 dB.

Figure 10:
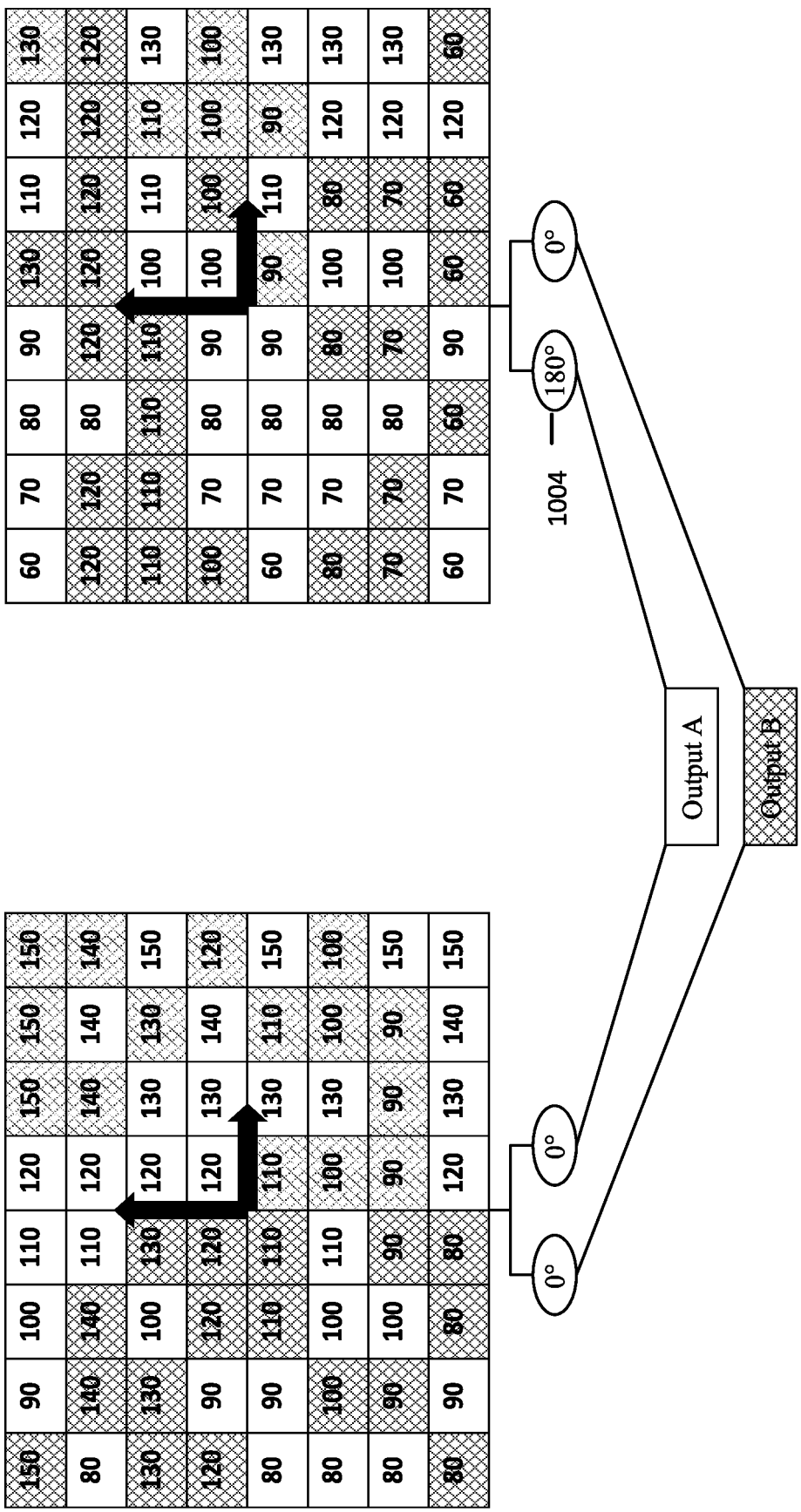
FIG. 10 depicts top plan views of a phased array antenna operated in first and second instances to generate first and second beams, with a selected 180 degree phase shift to one beam.

As depicted in FIG. 10, this methodology can be extended by applying standard multi-beam element combining to pseudo-random multi-beam sub-array combining to allow for multiple independent output beams at any polarization in any spatial location, at any frequency. This technique can be enhanced by applying an intentional phase offset to null out that beam if it is directly combined with other apertures. The beam can then be "un-nulled" through a second stage phase shifter 1004 and the other beam nulled. For instance, two apertures or phased array antennas 104 can both be used to generate first and second beams. Where the two beams are generated at the same angle relative to the antenna 104, and are thus directed to the same location, a second stage phase shifter 1004 can be used to apply a 180 degree phase shift to the phase angles 404 for the elements used to generate one of the beams in a second one of the phased array antennas 104b as compared to the first phased array antenna 104a. By applying a 180 degree phase shift to one beam of one sub-array or aperture 104b, and by splitting each aperture into two beams, efficiency can be increased while nulling out the other beam output.

Figure 11:
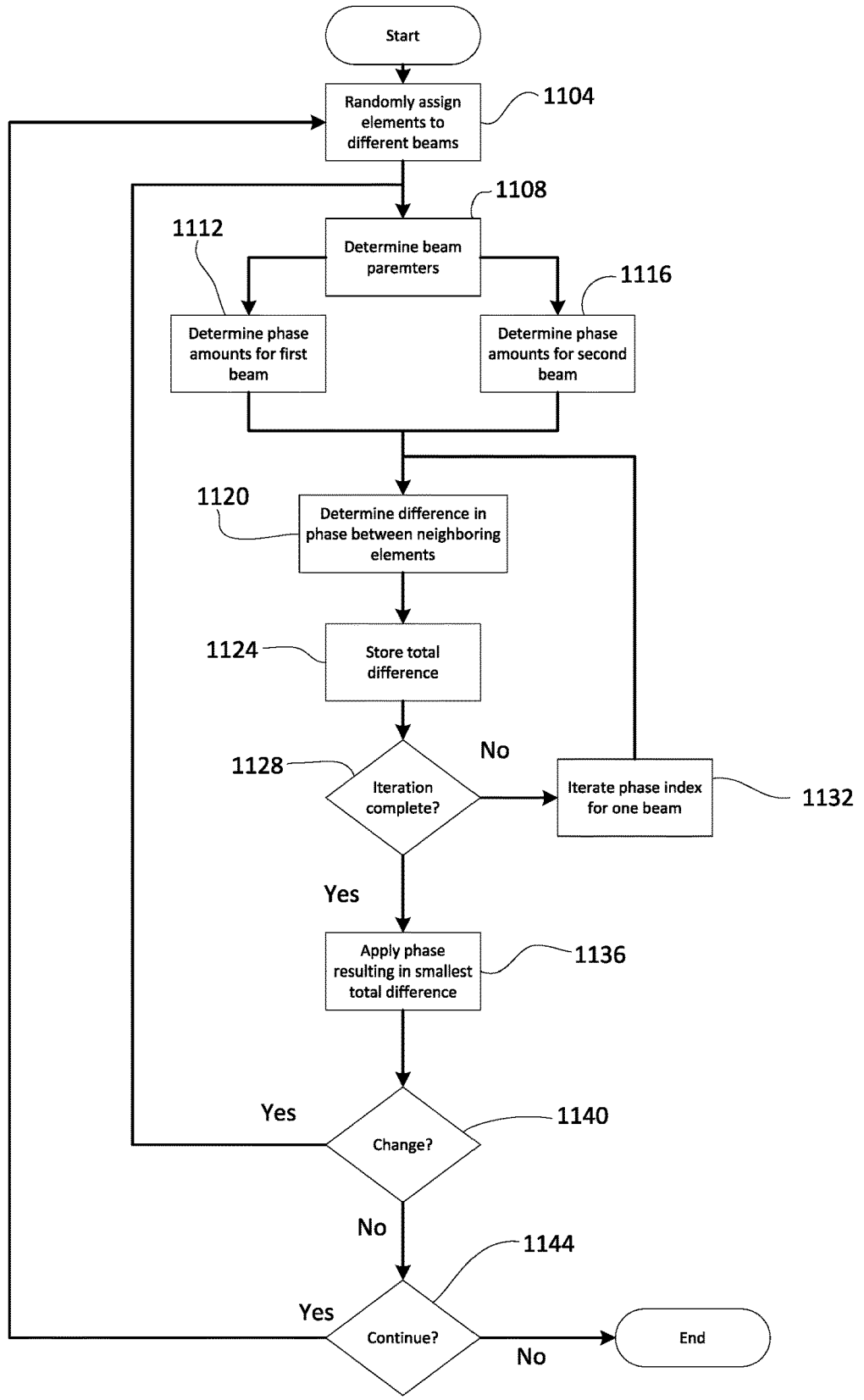
FIG. 11 is a flowchart illustrating aspects of the operation of a phased array antenna system to simultaneously generate two or more independent beams in accordance with embodiments of the present disclosure.

FIG. 11 is a flowchart illustrating aspects of the operation of a phased array antenna system to simultaneously generate two or more independent beams in accordance with embodiments of the present disclosure. The illustrated process can be performed through the execution of application programming 344 by the processor 336. Initially, at step 1104, a first set of randomly selected elements 108 within a phased array antenna 104 is assigned to generate a first beam 124a, and the remaining or second set of elements 108 within the phased array antenna 104 is assigned to generate a second beam 124b. The elements 108 used to generate the second beam 124b can be all of the elements 108 of the array 104 remaining after the random selection of the first set of elements 108. Moreover, for a two beam system, about half of the array 104 elements 108 are assigned to each beam, where about is +/−5%. At step 1108, beam parameters are determined. The beam parameters include steering directions for the beams. At step 1112 phase amounts are assigned to the elements 108 included in the first set of elements to achieve the required steering angle of the first beam 124a relative to the antenna 104, and at step 1116 phase amounts are assigned to the elements 108 included in the second set of elements to achieve the required steering angle of the second beam relative to the antenna 104. As depicted in the figure, the determination of the respective phase 404 assignments for the beams 124a and 124b can be performed in parallel. In addition, the assignment of the phase amounts 404 for generating one or both of the beams 124a and 124b can include a pseudo-random assignment of an initial or phase index amount also referred to herein as an index location.

At step 1120, the difference between phase amounts 404 of neighboring elements 108 assigned to different beams 124 is determined, and the total difference for the currently selected phase index amount is stored 1124. In particular, and as can be appreciated by one of skill in the art after consideration of the present disclosure, the effective or main beam power of the beams 124 will be optimized where the total difference between the phases of the neighboring elements is minimized. Moreover, as can also be appreciated by one of skill in the art after consideration of the present disclosure, a phase difference between neighboring elements of 180 degrees results in a nulling effect. The calculation of the difference with respect to each element 108 in the first set of elements can be made by calculating a difference between the phase 404 of any one element 108 in the first set of elements and any neighboring element 108 in the second set of elements. Alternatively, the calculation of the difference can be made by calculating the difference between the phase of any one element 108 in the first set of elements and a neighboring element belonging to the second set of elements that is in the same column or the same row as the element in the first set of elements. However neighboring element is defined, the total of the calculated phase differences is then determined for purposes of characterizing the efficiency of the array 104 configuration at the operative phase index amount.

In accordance with embodiments of the present disclosure, a phase 404 configuration that provides a reduced difference between elements 108 assigned to the different beams 124 is determined by iterating the phase index of the elements 108 assigned to one of the beams 124. For example, the phase index of the elements 108 assigned to generate the first beam 124a can be iterated by increasing the phase offset by 10 degrees for each iteration. Moreover, iteration can be performed for a selected number of steps. For example, where the method applies a for loop in which each iteration changes the index location of the phase 404 amounts for one beam 124 by 10 degrees, iteration can be considered complete after 17 iterations following the initial difference calculation have been completed. That is, iteration can be considered complete after 18 difference calculations, representing all of the possible iterations within a 180 degree span, have been calculated and stored in the memory 340. A determination as to whether iteration is complete is performed at step 1128. If it is determined that iteration is not complete, the process proceeds to step 1132, at which the phase index of the elements 108 assigned to generate the first beam 124a are increased by a selected amount. The process then returns to step 1120, to determine the total difference between the phases of neighboring elements 108, and to step 1124, where the total difference for this iteration is stored.

After an iteration is complete, the smallest total phase difference between neighboring elements 108 stored in the memory is identified, and the phase index amount associated with that total phase difference is applied to generate the first beam 124a (step 1136). The second beam is generated using the originally assigned phase values.

At step 1140, a determination can be made as to whether there has been a change related to an operating parameter of the antenna 104. Such a change can include, but is not limited to, the number of beams 124 being simultaneously generated, the steering angle of one or both of the beams 124, or a frequency of one or both of the beams 124. If an operating parameter of the antenna 104 has changed, the process can return to step 1108. Alternatively, the process can first return to step 1104, and a new, random assignment of elements 108 to the different beams 124 can be made. If an operating parameter of the antenna 104 has not changed, a determination can be made as to whether operation of the antenna 104 is to continue (step 1144). If operation is continued, the process can return to step 1140, to monitor for changes in the antenna operating parameters. Alternatively, the process can end.

As discussed herein, embodiments of the present disclosure provide systems and methods that enable the generation of multiple beams 124 from a single phased array antenna 104 aperture simultaneously. More particularly, elements 108 of a phased array antenna 104 are randomly assigned to operation in connection with one of the multiple beams 124. Embodiments of the present disclosure further provide for the pseudo-random selection of a phase index amount for at least one set of antenna elements 108, to avoid large phase differences between neighboring elements assigned to the generation of different beams 124. This novel and new method allow for two or more beams to be formed in two or more spatial positions at independent frequencies. Furthermore, a secondary multi-beam split allows for two beams at a single or separate position in space, at the same or different frequencies. This pseudo-random technique uses the well-known advantage of graceful degradation and randomized tapering in phased arrays. It allows for costly multi-beam forming systems to be used at higher levels of aperture combining.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for operating a phased array antenna, comprising:
    assigning a first set of elements included in the phased array antenna to generate a first beam;
    assigning a second set of elements included in the phased array antenna to generate a second beam;
    assigning a phase to each element in the first set of elements for steering the first beam at a first angle relative to the phased array antenna, wherein the phases assigned to the elements in the first set of elements are associated with a first phase index amount;
    assigning a phase to each element in the second set of elements for steering the second beam at a second angle relative to the phased array antenna;
    for each element in the first set of elements having at least one neighboring element included in the second set of elements, calculating a first difference between the assigned phase amount of the element in the first set of elements for steering the first beam at the first angle and a phase amount of the neighboring element or elements included in the second set of elements for steering the second beam at the second angle, wherein a plurality of first differences are obtained;

calculating a sum of the first differences;

changing the first phase index amount associated with the phases assigned to the elements in the first set of elements to a second phase index amount, wherein the phase assigned to each of the elements in the first set of elements is changed;

after changing the phase index amount associated with the phases assigned to the elements in the first set of elements from the first phase index amount to the second phase index amount, for each element in the first set of elements having at least one neighboring element included in the second set of elements, calculating a second difference between the assigned phase amount of the element in the first set of elements for steering the first beam at the first angle and the phase amount of the neighboring element or elements included in the second set of elements for steering the second beam at the second angle, wherein a plurality of second differences are obtained;

calculating a sum of the second differences;

identifying a smaller one of the sums of the first and second differences; and one of:

in response to identifying the sum of the first differences as the smaller one of the sums of the first and second differences, generating the first and second beams, wherein generating the first beam includes applying the first phase index amount to the phase assigned to each element in the first set of elements for steering the first beam at the first angle relative to the phased array antenna; or in response to identifying the sum of the second differences as the smaller one of the sums of the first and second differences, generating the first and second beams, wherein generating the first beam includes applying the second phase index amount to the phase assigned to each element in the first set of elements for steering the first beam at the first angle relative to the phased array antenna.

2. The method of claim 1, further comprising:
storing the calculated sum of the first differences in memory; and
storing the calculated sum of the second differences in the memory.

3. The method of claim 1, further comprising:
generating the second beam includes applying the phase amounts assigned to the second set of elements for steering the second beam at the second angle relative to the phased array antenna, wherein the first and second beams are generated simultaneously.

4. The method of claim 1, wherein the second phase index amount is pseudo-randomly selected.

5. The method of claim 1, wherein the second phase index amount is part of n phase index amounts, wherein the phase index amount of the first set of elements is changed n times, and wherein n is an integer.

6. The method of claim 5, wherein for each of the n phase index amounts the phase index is changed by a first amount.

7. The method of claim 6, wherein the first amount is 10 degrees.

8. The method of claim 1, wherein the elements assigned to the first or second sets of elements are selected randomly.

9. The method of claim 8, wherein about half of the elements are assigned to the first set of elements, and wherein the remaining elements are assigned to the second set of elements.

10. The method of claim 9, wherein the first phase index amount is pseudo-randomly selected.

11. The method of claim 1, further comprising:
receiving an instruction to change the angle of the first beam from the first angle relative to the phased array antenna to a third angle relative to the phased array antenna;

assigning a phase to each element in the first set of elements for steering the first beam at the third angle relative to the phased array antenna, wherein the phases are associated with an nth phase index amount, and wherein n is an integer;

for each element in the first set of elements having at least one neighboring element included in the second set of elements, calculating an nth difference between the assigned phase amount of the element in the first set of elements for steering the first beam at the third angle and a phase amount of the element or elements included in the second set of elements for steering the second beam at the second angle, wherein a plurality of nth differences are obtained;

calculating a sum of the nth differences;

changing the nth phase index amount associated with the phases assigned to the elements in the first set of elements to an (n+1)th phase index amount, wherein the phase assigned to each of the elements in the first set of elements is changed after changing the phase index amount associated with the phases assigned to the elements in the first set of elements from the nth phase index amount to the (n+1)th phase index amount, for each element in the first set of elements having at least one neighboring element included in the second set of elements, calculating an (n+1)th difference between the assigned phase amount of the element in the first set of elements for steering the first beam at the third angle and a phase amount of the neighboring element or elements included in the second set of elements for steering the second beam at the second angle, wherein a plurality of (n+1)th differences are obtained;

calculating a sum of the (n+1)th differences;

identifying a smaller one of the sums of the nth and (n+1)th differences; and one of:

in response to identifying the sum of the nth differences as the smaller one of the sums of the first and second differences, generating the first and second beams, wherein generating the first beam includes applying the nth phase index amount to the phase assigned to each element in the first set of elements for steering the first beam at the third angle relative to the phased array antenna; or in response to identifying the sum of the (n+1)th differences as the smaller one of the sums of the nth and (n+1)th differences, generating the first and second beams, wherein generating the first beam includes applying the (n+1)th phase index amount to the phase assigned to each element in the first set of elements for steering the first beam at the third angle relative to the phased array antenna.

12. The method of claim 11, further comprising:
storing the calculated sum of the nth differences in memory; and storing the calculated sum of the (n+1)th differences in the memory.

13. The method of claim 12, wherein the phased array antenna is operated to generate the first beam at the third angle relative to the phased array antenna and to simultaneously generate the second beam at the second angle relative to the phased array antenna.

14. A communication system, comprising:
a phased array antenna having a plurality of elements;
a processor; and
memory,
wherein the processor executes application programming to:
assign about half of the plurality of elements to a first set of elements;
assign a remaining about half of the plurality of elements to a second set of elements;
assign a first phase amount to each element in the first set of elements to steer a first beam at a first angle relative to the phased array antenna;
assign a second phase amount to each element in the second set of elements to steer a second beam at a second angle relative to the phased array antenna;
calculate a first total difference between the first phase amount of each element in the first set of elements and the second phase amount of each neighboring element in the second set of elements;
modify the first phase amount of each element by applying a revised phase index amount to first phase amount of each element;
calculate a revised total difference between the modified first phase amount of each element in the first set of elements and the second phase amount of each neighboring element in the second set of elements;
determine which of the first total difference or the revised total difference is a smaller value; and one of:
in response to determining that the first total difference is the smaller value, generate the first beam by applying the first phase amount to each element in the first set of elements, and generate the second beam by applying the second phase amount to each element in the second set of elements; or
in response to determining that the revised total difference is the smaller value, generate the first beam by applying the modified first phase amount to each element in the first set of elements, and generate the second beam by applying the second phase amount to each element in the second set of elements.

15. The communication system of claim 14, further comprising:
the processor further executing the application programming to:
iterate a phase of the elements of the first set of elements by applying a series of different revised phase index amounts;
for each iteration, calculate a total difference between phase amounts of elements in the first set of elements and neighboring elements in the second set of elements;
store the calculated total difference for each iteration in the memory;
select the iteration with a smallest calculated total difference; and
generate the first beam by applying the revised phase index amount for the iteration resulting in the smallest calculated total difference to each element in the first set of elements, and generate the second beam by applying the second phase amount to each element in the second set of elements.

16. The communication system of claim 15, wherein the elements are formed as electrically conductive patches on a dielectric antenna substrate surface.

17. The communication system of claim 16, wherein the system further comprises:
a transceiver; and
a feed network, wherein the feed network includes phase shifters associated with each antenna element, and wherein the phase shifters are controlled by the processor executing the application programming.

18. A method for generating multiple radio frequency (RF) beams simultaneously from a single phased array antenna aperture, comprising:
assigning a first set of elements of a phased array antenna to generate a first beam;
assigning a second set of elements of the phased array antenna to generate a second beam;
assigning phase amounts to the elements in the first set of elements to generate the first beam at a first selected angle relative to the phased array antenna;
assigning phase amounts to the elements in the second set of elements to generate the second beam at a second selected angle relative to the phased array antenna;
calculating a total phase difference amount between a phase in each element in the first set of elements having a neighbor element included in the second set of elements for each of n different sets of modified phase amounts assigned to the elements in the first set of elements and the assigned phase amount of each of the neighbor elements of the second set of elements, wherein the n different sets of modified phase amounts are modified by application of a different phase index amount, and wherein n is an integer;
identifying the phase index amount from the n different sets of modified phase amounts resulting in a smallest calculated total phase difference amount;
generating the first beam using the first set of elements and the modified phase amounts corresponding to the identified phase index amount; and
generating the second beam using the second set of elements and the phase amounts assigned to the second set of element.

19. The method of claim 18, further comprising:
steering one of the beams to a new angle relative to the phased array antenna; and
recalculating the total phase difference amount between a phase in each element in the first set of elements having a neighbor element included in the second set of elements for each of the n different sets of modified phase amounts assigned to the elements in the first set of elements and the assigned phase amount of each of the neighbor elements of the second set of elements.

* * * * *